Patented Dec. 24, 1940

2,225,664

UNITED STATES PATENT OFFICE 2,225,664

COATING COMPOSITION

Alfred Siegel, Roselle, N. J., assignor to E. I. du Pont de Nemours & Company, Wilmington, Del., a corporation of Delaware No Drawing. Application December 1, 1937, Serial No. 177,477

4 Claims. (Cl. 260—40)

This invention relates to novel types of coating compositions, and more particularly to the provision of a highly durable coating composition comprising a maroon pigment and a resin vehicle.

In its specific and preferred embodiment, the invention relates to the provision of an exceedingly durable coating composition comprising a specific type of maroon pigment and a synthetic resin enamel vehicle.

Synthetic resin enamels are well known in the art of coating compositions. Among various types of synthetic resins, the polyhydroxy alcohol-polycarboxylic acid condensation products, or alkyd resins, are especially well known and enjoy wide usage. Although these enamels usually give rise to relatively durable films, certain types of pigments which have been employed therein seriously and undesirably affect the durability properties of the resultant films. Pigments having a pleasing maroon shade and economically available for commercial exploitation are especially notorious in this respect, their use in synthetic resin vehicles résulting in deleterious effects upon film durability and stability.

The need for a maroon pigment generally adapted for use in resinated vehicles, and especially in synthetic resin enamels such as those of the alkyd resin type, and one which will combine the features of relatively low cost and excellent durability with required ease of dispersion and freedom from bleeding or solubility in the vehicles and thinners employed, although long felt, has been heretofore unobtainable.

Accordingly, it is among the objects of the present invention to fulfil this long-felt need and to provide a maroon pigment for the purpose which is relatively inexpensive to manufacture, has no deleterious effect upon but enhances film durability, and is free from any tendency to "bleed" when employed in the enamels. Other objects and advantages of the invention will appear as the ensuing description proceeds.

These objects and advantages are obtainable in the present invention, which broadly comprises employing as an essential pigment ingredient in a resinated vehicle the manganese salt of the azo dye formed by coupling diazotized alpha naphthylamine with 1-naphthol-5-sulfonic acid.

In its preferred adaptation, the invention comprises incorporated as an essential ingredient in an alkyd resin enamel the manganese salt of the azo dye pigment formed by coupling diazotized alpha naphthylamine with 1-naphthol-5-sulfonic acid, the relative amounts of pigment and vehicle being dependent upon the properties desired in the finished enamel.

The manganese salt of the foregoing azo dye is eminently suited for use in the present invention and is obtainable by well known methods. Thus, diazotized alpha naphthylamine may be coupled with 1-naphthol-5-sulfonic acid by usual and well known azo coupling technique, and the more or less insoluble sodium or other alkali salt of said azo dye obtained. This dye, as well as its calcium and other alkaline earth metal salts, although a maroon colored pigment, is not desirably suited for use in the invention. Accordingly, I preferably react the insoluble salt so obtained with a soluble salt of manganese (such as manganous chloride, acetate, sulfate, etc.) to produce my useful azo pigment, which exhibits the unexpected and unique properties of being highly useful as a durable maroon pigment, and particularly beneficial for use in resin-containing coating compositions, and especially synthetic resin enamels.

In adapting the invention to practice, suitable resin solutions may be made up, combined in the well-known manner, and in accordance with the desired formulation. Examples of suitable resin solutions comprise the following, the figures being in percentage composition by weight:

Resin Solution A

| | |
|---|---:|
| Linseed oil | 15.0 |
| China wood oil | 7.3 |
| Glycerine | 8.5 |
| Litharge | Trace |
| Phthalic anhydride | 20.7 |
| Petroleum naphtha | 48.5 |
| | 100.0 |

Resin Solution B

| | |
|---|---:|
| Linseed oil | 49.8 |
| Glycerine | 10.4 |
| Litharge | Trace |
| Phthalic anhydride | 23.6 |
| Petroleum solvent | 16.2 |
| | 100.0 |

Resin Solution C

This is a rosin modified phenol formaldehyde resin used in a suitable solvent. A suitable illustration is the material marketed under the trade name "Amberol F-7," dissolved in a high solvency petroleum solvent.

Resin Solution D

This is a phenol formaldehyde resin, such as that sold under the trade name of "Bakelite BR-254," blended with suitable quantities of drying oil and solvent.

Resin Solution E

This is a rosin modified phenol formaldehyde resin blended with suitable quantities of drying oil and solvent.

Upon preparation of a suitable resin solution, as aforesaid, or in accordance with any other desired formulation, the resultant solution may be compounded, ground or otherwise mixed in a conventional mill, such as a ball mill or other means, with a suitable quantity of the maroon pigment of the present invention, mixing being continued until dispersion becomes substantially complete. Such milling or mixing may take place in the absence or presence of suitable modifying agents, as desired. Thus, in accordance with the present invention, suitable coating compositions employing resin solutions, such as the type illustrated, and the aforesaid maroon colored azo dye pigment may be made up in accordance with the following examples, the figures in each instance being in percentage composition by weight:

EXAMPLE I

Alkyd resin enamel

| | |
|---|---|
| Manganese salt of azo dye pigment | 8 |
| Resin Solution A | 64 |
| Mixture of aliphatic and aromatic hydrocarbons | 28 |
| | 100 |

When this enamel is used to coat metallic panels which are exposed to the weather, it is found that the enamel shows no failure after substantially two years exposure. Other maroon enamels including the calcium salt of the same dye are found to fail by checking in about one year or less. The superiority of the enamel of this example is thus clearly shown.

EXAMPLE II

Alkyd resin enamel

| | |
|---|---|
| Manganese salt of azo dye pigment | 10 |
| Resin Solution B | 48 |
| Mixture of aliphatic and aromatic hydrocarbons | 42 |
| | 100 |

EXAMPLE III

Modified alkyd resin enamel

| | |
|---|---|
| Manganese salt of azo dye pigment | 8 |
| Resin Solution A (50% solids) | 58 |
| Resin Solution C (assuming 50% solids) | 6 |
| Mixture of aliphatic and aromatic hydrocarbons | 28 |
| | 100 |

EXAMPLE IV

Phenol formaldehyde resin enamel

| | |
|---|---|
| Manganese salt of azo dye pigment | 8 |
| Resin Solution D (assuming 50% solids) | 64 |
| Mixture of aliphatic and aromatic hydrocarbons | 28 |
| | 100 |

EXAMPLE V

Resin-modified phenol formaldehyde resin enamel

| | |
|---|---|
| Manganese salt of azo dye pigment | 8 |
| Resin Solution E (assuming 50% solids) | 64 |
| Mixture of aliphatic and aromatic hydrocarbons | 28 |
| | 100 |

The enamels of Examples I, III, IV and V may be ground in the same way as set forth in detail under Example II and when used in protective coatings are found to exhibit the same relative superiority in durability.

The specific amounts of pigment, vehicle and thinner set forth in the foregoing examples are intended to be illustrative only and are obviously subject to wide variance and change, in order to obtain desired changes in degree of gloss, depth of shade and the like.

Similarly, while the examples set forth as useful drying oil modified alkyd resins, the preferred embodiment, and certain modified phenol-formaldehyde resins, it is to be understood that these comprise merely principal and exemplary types of synthetic resins used in coating compositions intended for exterior application. Obviously, other resins, such as certain hydrocarbon resins, resins which are derivatives of rubber, the various vinyl resins, and the like, may be employed with equally beneficial effects under the invention. The term "resin vehicle" as herein employed and in the appended claims, therefore, embraces all such useful types of resins, and especially the synthetic variety, adapted for use in coating compositions. I have found that these types of vehicles give optimum benefits under the invention and are to be preferred over vehicles such as linseed oil per se.

The use of minor amounts of well-known foreign intermediates in the preparation of azo couplings to modify the resultant pigments, is also contemplated, since the invention is broadly directed to the use of any pigment of which the principal ingredient comprises the manganese salt of the azo dye formed by coupling diazotized alpha naphthylamine with 1-naphthol-5-sulfonic acid, irrespective of its method of preparation. If desired, the usual substrata employed in the lake industry, such as aluminum hydrate, blanc fixe, etc., may be associated with the pigment toner. The use of such substrata in coating compositions of the type contemplated, however, is subject to more or less well-defined limitations, all of which are well understood by those skilled in the art.

The maroon pigment manganese salt of the aforesaid azo dye will be found to be excellently light-fast and non-fading in character. Coating compositions formulated in accordance with the invention will be highly suitable for decorative and protective purposes and will be found to be particularly adaptable for application to metal, wood or other surfaces, being especially well suited for protection from exposure to the elements, including bright sunlight.

I claim as my invention:

1. A durable coating composition comprising in combination a resin vehicle and a non-bleeding, vehicle-insoluble pigment ingredient comprising the manganese salt of the azo dye formed by coupling diazotized alpha-naphthylamine with 1-naphthol-5-sulfonic acid.

2. A durable coating composition comprising in combination a synthetic alkyd resin enamel and a non-bleeding, insoluble pigment ingredient, the manganese salt of the azo dye formed by coupling diazotized alpha naththylamine with 1-naphthol-5-sulfonic acid as a pigment.

3. A protective durable coating material, comprising a synthetic resin enamel and as an essential ingredient thereof a non-bleeding, insoluble pigment substance consisting of the manganese salt of the azo dye formed by coupling diazotized alpha naphthylamine with 1-naphthol-5-sulfonic acid.

4. A durable coating composition comprising in combination a synthetic resin vehicle and a vehicle-insoluble, non-bleeding pigment ingredient, the manganese salt of the azo dye formed by coupling diazotized alpha naphthylamine with 1-naphthol-5-sulfonic acid.

ALFRED SIEGEL.